Oct. 18, 1949.  F. TURRETTINI  2,484,972
OPTICAL COMPARISON PROJECTING APPARATUS HAVING
INTERCHANGEABLE OBJECTIVES AND CONDENSERS
Filed May 16, 1947  4 Sheets-Sheet 1

INVENTOR
FERNAND TURRETTINI,
BY
ATTORNEY

Oct. 18, 1949.  F. TURRETTINI  2,484,972
OPTICAL COMPARISON PROJECTING APPARATUS HAVING
INTERCHANGEABLE OBJECTIVES AND CONDENSERS
Filed May 16, 1947  4 Sheets-Sheet 2

INVENTOR
FERNAND TURRETTINI,
BY
ATTORNEY

Oct. 18, 1949.  F. TURRETTINI  2,484,972
OPTICAL COMPARISON PROJECTING APPARATUS HAVING
INTERCHANGEABLE OBJECTIVES AND CONDENSERS
Filed May 16, 1947  4 Sheets-Sheet 3

INVENTOR
FERNAND TURRETTINI,
BY
ATTORNEY

Oct. 18, 1949.	F. TURRETTINI	2,484,972
OPTICAL COMPARISON PROJECTING APPARATUS HAVING
INTERCHANGEABLE OBJECTIVES AND CONDENSERS
Filed May 16, 1947	4 Sheets-Sheet 4
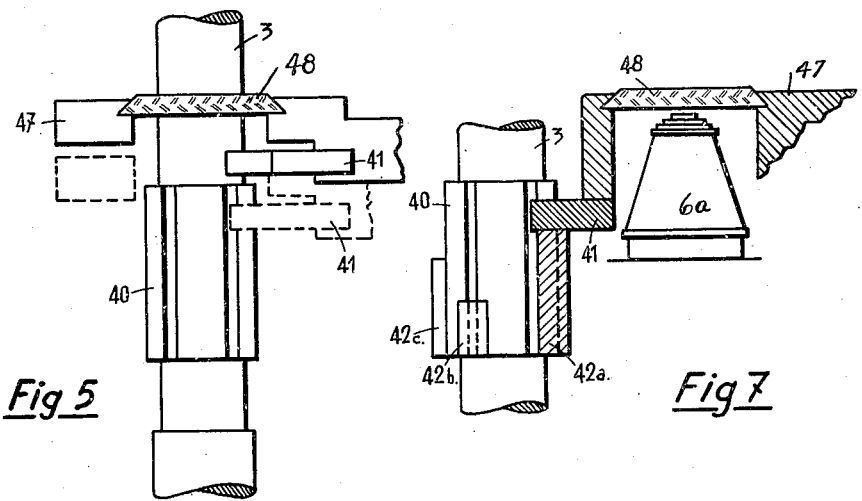
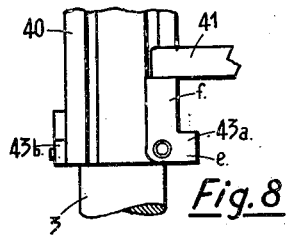
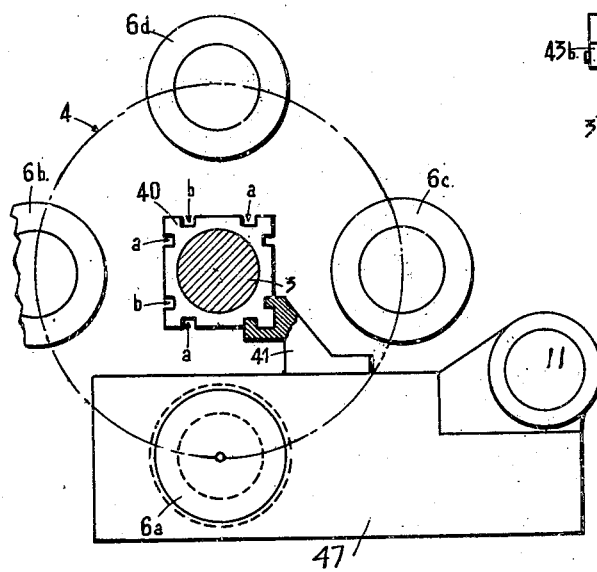
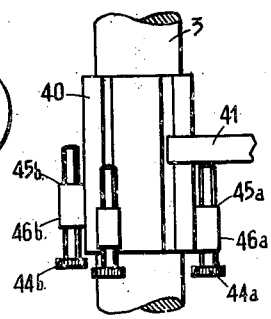
INVENTOR
FERNAND TURRETTINI,
BY
ATTORNEY Patented Oct. 18, 1949

2,484,972

UNITED STATES PATENT OFFICE 2,484,972

OPTICAL COMPARISON PROJECTING APPARATUS HAVING INTERCHANGEABLE OBJECTIVES AND CONDENSERS

Fernand Turrettini, Bellevue-Geneva, Switzerland

Application May 16, 1947, Serial No. 748,528
In Switzerland December 27, 1940

Section 1, Public Law 690, August 8, 1946
Patent expires August 8, 1961

5 Claims. (Cl. 88—24)

Various types of optical projection apparatus for use in the examination of manufactured articles or other objects are known. They are all provided with an object table and with interchangeable objectives and interchangeable condensers enabling various magnifications to be produced with the same projection apparatus.

The object table must necessarily be located between the condenser and the objective in use, and this for every possible combination of the optical elements, this combination varying according to the magnification required. Further, the object table is generally movable parallel to the optical axis of the apparatus. For this purpose it is preferably secured to a support capable of carrying out a vertical movement. Finally for effecting adjustment of the exact position of the object relatively to the optical axis, the object table is generally provided with two crossing adjusting slides.

However where it is desired to produce a considerable magnification the frontal distance of the projection objective from the object and the frontal distance of the corresponding condenser therefrom are necessarily short. The objective and the condenser therefore approach very closely to the object table and hinder the placing of objects to be projected on the object table; also in this position the table constitutes an obstacle to access to the objective and the condenser.

In some cases the distance to the objective may be so small that the objective has to enter a recess provided in the thickness of the object table. In this position any turning movement of the rotary objective carrier or any disengaging movement of the object table causes one to strike the other thus producing damage.

The subject of the present invention is a projection apparatus provided with a plurality of interchangeable objectives and of interchangeable condensers and with a single object table which enables the above mentioned disadvantages to be eliminated in that means are provided for withdrawing the said object table and its support rapidly and completely from the optical axis of the apparatus.

In the accompanying diagrammatic drawings:

Fig. 5 is a diagrammatic view in elevation showing a locking device, and an object table which is shown in full lines, in a position raised sufficiently for being disengaged from the locking device, the broken lines showing the interengagement of the locking members when the object table is in a lower position.

Fig. 6 is a diagrammatic plan view showing the objective, the locking members and the object table.

Figs. 7 to 9 are detail views showing three modified forms of construction of securing stops for determining for each objective its minimum distance from the object table.

Figure 1:
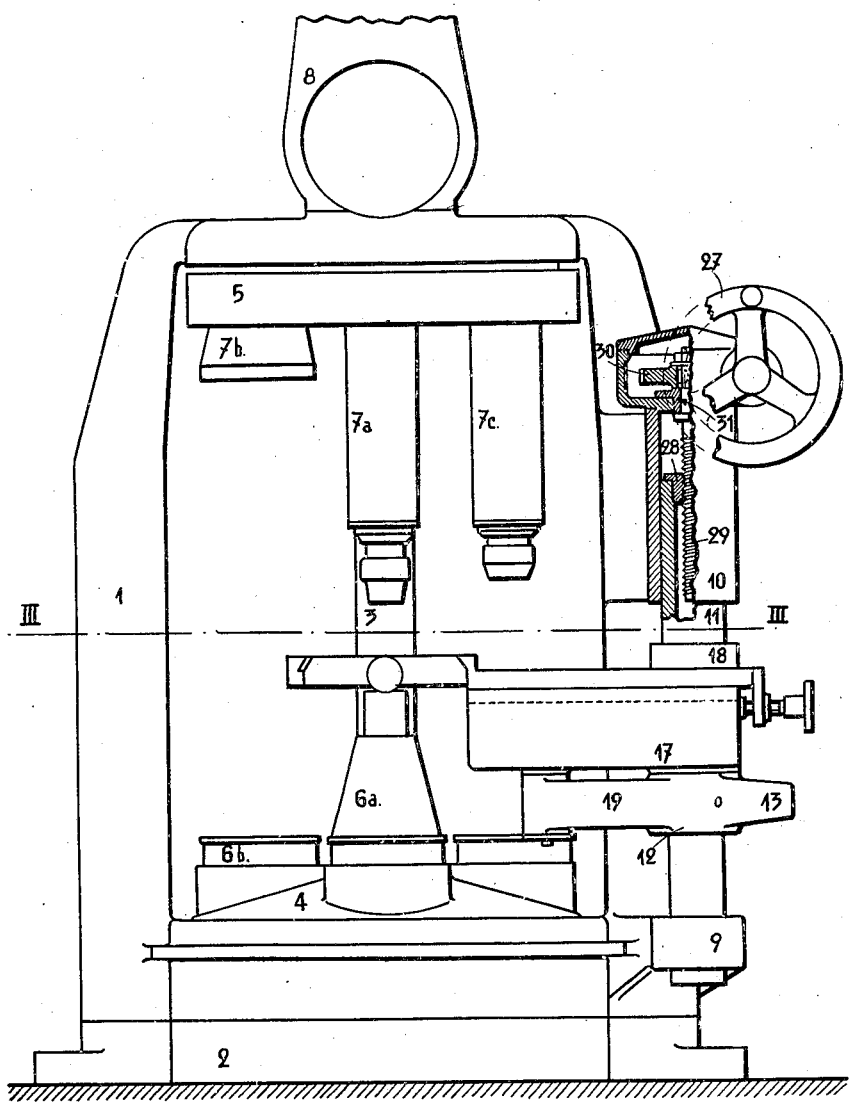
Fig. 1 is a view in elevation with some parts in section of one construction by way of example.
Figure 2:
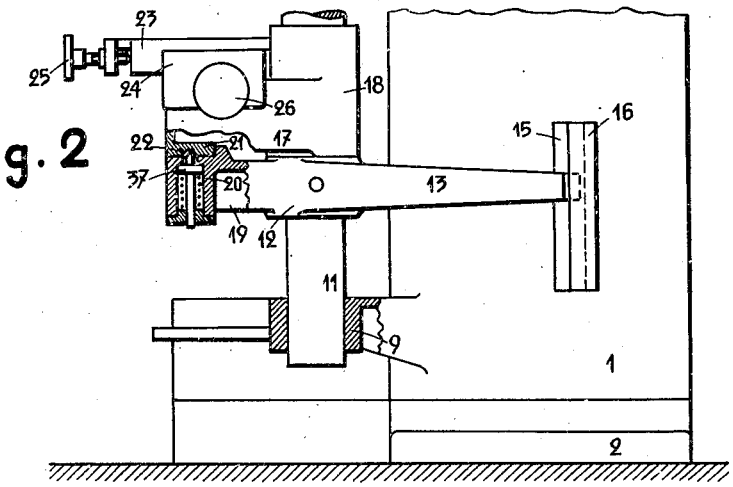
Fig. 2 is a detail view and Fig. 3 is a section on the line III—III of Fig. 1.
Figure 3:
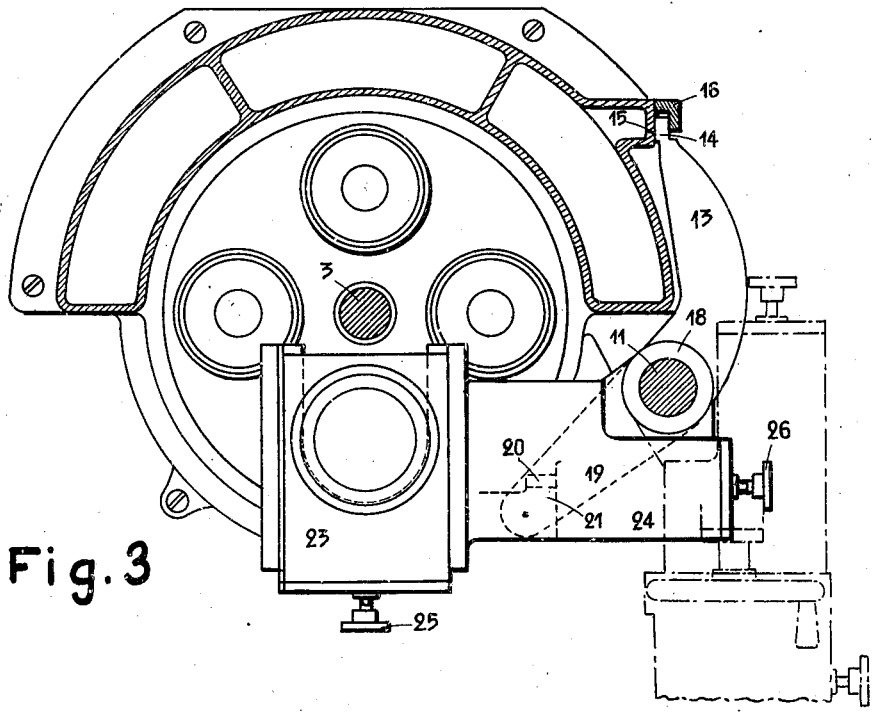

As shown in Figs. 1 to 3, inclusive, the projection apparatus is provided with a frame work 1 resting on a base 2. This frame work is provided with two parts (not shown) in which pivots a shaft 3 to which are keyed a rotary objective carrier 4 and a condenser carrier 5. Two objectives 6a, 6b and three condensers 7a, 7b and 7c can be seen in Fig. 1. A lamp 8, containing a source of illumination is mounted at the top of the framework 1. The latter is also provided with two bearings 9 and 10 which support an axially movable member, formed by a column 11, to which is keyed a collar 12. The column 11 is prevented from turning by an arm 13 secured to the collar 12. This arm ends in a slide 14 capable of moving in a groove formed by a surface 15 provided at the side of the framework 1 and a retaining strip 16 screwed to the surface 15. The object table is mounted on a support 17 provided with a sleeve 18 embracing the column 11. A second arm 19, secured to the collar 12, extends under the support of the object table. This arm 19 is provided at 20 with a projection against the side of which bears a corresponding element 21 (Fig. 3), provided under the support 17. These two projections define the operating position of the object table relatively to the projection axis, and the table is held in this position by a locking member formed by a spring actuated pin 37 pressed against an inclined plane 22 provided in the support 17. This locking member is arranged in such a manner as to press the projection 21 of the support 17 against the projection 20 of the arm 19.

The object supporting table comprises, as usual, two crossing adjusting slides 23 and 24, fitted with adjusting screws 25 and 26 enabling the object placed on the object table to be moved in two directions at right angles to one another. These slides thus enable the object or the part of the object to be examined, to be placed exactly in the optical axis of the apparatus.

The column 11 is provided with a nut 28 through which passes a screw 29 suspended from a bearing 31 and which carries a pinion 30 gearing with another pinion (not shown) connected to a handwheel 27.

The setting of the apparatus is effected by actuating the handwheel 27 which produces the axial movements (parallel to the optical axis of the apparatus) of the column 11. The latter raises and lowers the object table through the medium of the collar 12 on which rests the sleeve 18 of the support 17.

The projection apparatus as so far described in the present invention is thus an apparatus provided for the same purpose as other known projection apparatus with a plurality of objectives and condensers, and an object table provided with crossing adjusting slides and capable of being moved parallel to the optical axis of the apparatus for the purpose of setting.

In accordance with the invention, the object table can be withdrawn rapidly from the optical axis of the apparatus. For this purpose this table assembly can be moved in a plane normal to the optical axis. In the form of construction described by way of example with reference to Figs. 1 to 3, inclusive, of the accompanying drawings, the object table can be moved from its operative position (Fig. 3 full lines) by simply rotating it about the column 11 so that it occupies a withdrawn position indicated in chain dotted lines. It will be understood that this rotation of the object table might be effected about any other axis parallel to the optical axis of the apparatus.

The object table may also be withdrawn from the operative position by a translational movement in a plane perpendicular to the optical axis of the apparatus. Thus for example the support 17 may be secured to the column 11 and be provided with a slide carrying the object table provided with its two crossing adjusting slides.

The operative position of the object table is defined by the projections 20 and 21 and the locking member tends to hold it in this position by pressing these projections against one another. It will be understood that this locking device may be replaced by any other known device.

Figure 4:
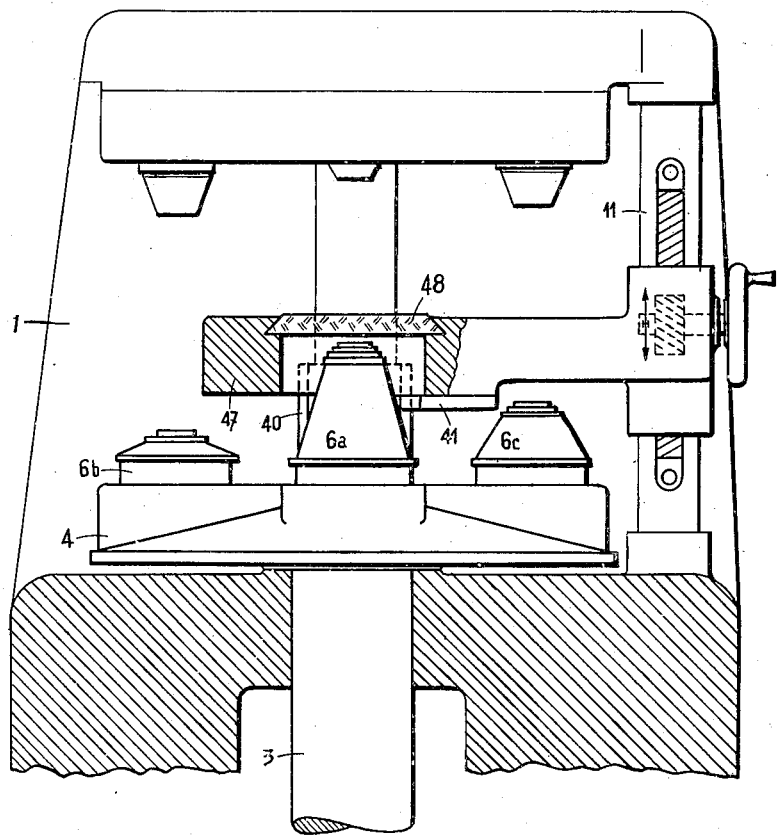
Fig. 4 is a view in elevation of a modification of the apparatus with parts in section, showing the general arrangement of a rotary objective carrier and of the object table, both parts being in the operative position.

In its construction shown in Fig. 4 the rotary objective carrier 4 is keyed to the rotary shaft 3. It carries four objectives of which only the first three 6a, 6b, 6c are shown in the drawing. Above the objectives is located an object table 47 sliding along the column 11 and adjustable in height along this column by any suitable means such as that shown, or for example by means of the device hereinbefore described.

For the purpose of withdrawing the object table from the optical axis, it is caused to pivot about the axis of the column 11. In the case shown in Fig. 4 the objective 6a is of considerable magnification and must enter a recess in the thickness of the object table 47 so as to reach the distance by which it is to be separated from the object plane, formed by the upper face of the glass sheet 48. In this position any movement of the object carrier or of the object table at right angles to the optical axis of the apparatus would produce a collision between the objective 6a and the object table.

Figs. 5 and 6 show a form of construction of a locking device. To the shaft 3 is keyed a polyhedral member 40 formed with stops and having the same number of stops as the rotary carrier has objectives. In proximity to each stop are provided longitudinal grooves a, b with which are adapted to engage projections on a member 41 secured to the object table 47.

It will be seen that when the member 41 engages with the grooves of the member 40 by means of its projections it is impossible to rotate the rotary objective carrier or to pivot the object table.

It is however possible to move the object table parallel to the optical axis. This movement enables the projections of the member 41 to be disengaged from the polyhedral member 40. When this has been done the object table can be moved away from the optical axis of the apparatus and the objective carrier can be turned.

The height of the member 40 is determined according to the distance which must separate the objective of large magnification and the object and according to the thickness of the material of the object table 47. Thus for setting any objective for example the fourth objective 6d (Fig. 6), the object table 47 should first be raised until the member 41 is disengaged completely from the polyhedral member 40 so that the longest objective for example the objective 6a, can pass freely under the lower face of the object table. The rotary objective carrier may then be turned until the objective 6d is stopped in the optical axis by any suitable means provided for the purpose.

The object table is then returned into this axis if it was previously removed therefrom. The projections of the member 41 secured to the object table are then in line with another pair of grooves a, b of the polyhedral member 40. The object table may then be lowered to the distance suitable for the objective 6d.

In order to prevent the object table being lowered in a dangerous manner and thus being liable to damage an objective or the glass plate 48, stops are provided which limit the movement of the table in this direction.

According to Fig. 7 a series of stationary stops 42a, 42b, 42c is provided on the polyhedral member 40. The upper face of each of these stops is adapted to come into contact with the lower face of the member 41 secured to the object table, and is at such a height that it limits the movement of the table in a direction towards the objective to that appropriate to the size of the objective with which it is associated and in such a manner that the plate 48 cannot be damaged. It will be understood that these stops are provided in such a manner as not to interfere in any way with the setting of the apparatus.

According to Fig. 8 the stops are formed by pivoted members 43a, 43b having two arms e and f of unequal length. The length of the shortest arm e is such that, when the arm is turned upwards, it prevents the objective used from damaging the glass plate, whilst the length of the other arm f is such that when its upper face comes into contact with the lower face of the member 41 this approximately determines the setting position of the object to be projected.

It is possible to provide pivoted members having more than two arms of different lengths. The shortest arm determines the minimum distance between the object table and the objective used, whilst the other arms of greater length determine various heights of the table each corresponding with the setting of different objects. These arms thus represent suitable marks for effecting rapid adjustment of the apparatus.

According to the modification shown in Fig. 9 nuts 46a, 46b are secured to the polyhedral member 40. The member 41 coming into contact with one of the upper faces 45a, 45b of the nuts determines the minimum distance compatible with the security of the objective used and of the glass plate 48. Screws 44a, 44b may project more or less upwardly from the nuts 46a, 46b. Contact of their upper ends with the member 41 enables an adjustable height of the object table to be found readily.

It will be understood that the locking members secured respectively to the objective carriers and to the object table and constituted, in the form of construction shown in the drawing, by the polyhedral member 40 and by the member 41 may be of a shape different to that shown in the drawing, according to the type of apparatus to which they are applied.

I claim:

1. In a projection apparatus, the combination comprising a frame, a vertically disposed shaft journaled in the frame, a rotary objective carrier rigid with the lower end portion of the shaft, an upper and lower bearing, a column slidable in the bearings, collar means rigid with the column, an arm at one end rigid with the collar and at the other end guided by the frame for vertical sliding, a support rotatable about the column and supported by the collar, a table comprising crossing slides adjustable at right angles to one another and supported by the support, a second arm secured to the collar and supporting the support, a pair of projections one on the support and one on the second arm and in engaged position defining the operative position of the object table in substantial alignment with the optical axis, operable means in the second arm engaging the support and holding same and the table in substantial operative position and urging the projections to engaging position, and means sliding the column vertically in its bearings.

2. In a projection apparatus, the combination comprising a frame, a vertically disposed shaft journaled in the frame, a rotary objective carrier rigid with the lower end portion of the shaft, an upper and lower bearing, a column slidable in the bearings, a support swingable about the column and carried thereby, an object table supported by the support, tongue and groove means slidable one within the other, the tongue and groove means comprising a plurality of angularly spaced elements rigid with the objective carrier shaft and an element rigid with the support whereby vertical displacement of the support and column will cause sliding of the last element relative to a selected one of the first elements to prevent rotation of the objective carrier shaft and swinging of the support and table.

3. The combination according to claim 2 and also comprising a plurality of stops one on each first element to limit sliding of the second element.

4. The combination according to claim 3 and wherein each stop is pivoted to one of the first elements and comprises a pivoted part having at least two spaced apart stop surfaces located at different distances from the pivot axis.

5. The combination according to claim 3 and wherein each of the stops are threaded into one of the first elements for adjustment.

FERNAND TURRETTINI.

REFERENCES CITED

The following references are of record in the file of this patent:

UNITED STATES PATENTS

| Number | Name | Date |
|---|---|---|
| 1,989,691 | Hirt | Feb. 5, 1935 |
| 2,209,532 | Michel | July 30, 1940 |
| 2,226,618 | Kuppenbender | Dec. 31, 1940 |
| 2,230,573 | Mestre | Feb. 4, 1941 |
| 2,313,639 | Hauser | Mar. 9, 1943 |

FOREIGN PATENTS

| Number | Country | Date |
|---|---|---|
| 218,410 | Switzerland | Mar. 16, 1942 |
| 218,409 | Switzerland | Apr. 1, 1942 |